United States Patent Office 2,892,528
Patented June 30, 1959

2,892,528

CARRIAGE RETURN CONTROL APPARATUS FOR ELECTRICALLY OPERATED BUSINESS MACHINES

Wilhelm Breitling, Hans Hess, and Hans Kamp, Wilhelmshaven, Germany

Application April 24, 1956, Serial No. 580,232

Claims priority, application Germany April 25, 1955

13 Claims. (Cl. 197—66)

The present invention relates to control apparatus for electrically operated business machines. More particularly, the present invention relates to an apparatus for controlling the carriage return movement in electrically operated business machines.

In conventional electrically operated business machines such as typewriters, calculating machines and the like, it is necessary to provide a carriage return apparatus. Such carriage return apparatus moves the carriage or platen of the business machine to a desired starting position. For example, in a typewriter, the desired end position for the carriage return would be at that position corresponding to the left-hand margin of the paper in the typewriter.

While the carriage of a business machine is manually returned in non-electrical machines, it is clear that electrical operation of the carriage return mechanism is highly desirable and advantageous. In conventional electrical carriage return mechanisms, the carriage is moved towards its desired end position by a particular driving means. Since there is a tendency to overshoot the desired end position, some braking means are provided for stopping the carriage at the proper return position.

In the conventional carriage return mechanisms, a spring is usually used for the braking mechanism. Accordingly, if the carriage return switch is kept closed or is actuated while the carriage is near its end position and in its overshoot position, the carriage is continually moved into engagement with the spring braking means until the carriage return button is released. It is clear that this imparts a highly undesirable vibration to the business machine with attendant wear of the moving parts. In addition, when the carriage is moved by the spring braking means back from the overshoot position into the desired end position, undesirably loud noises result from the carriage movement into the desired fixed end position. That is, usually some detent means are provided for fixing the desired carriage return position in the business machine. The movement of the carriage into contact with the detent means as it is moved into its return or end position and as it moves back from its overshoot position results in the undesirably loud noises.

The present invention overcomes these disadvantages of conventional apparatus by providing a control circuit and apparatus which prevents continual operation of the carriage return movement when the carriage is at its end position and in the overshoot position.

It is accordingly an object of the present invention to overcome the disadvantages of conventional apparatus described hereinabove.

A second object of the present invention is to provide a new and improved apparatus for controlling the carriage return movement in electrically operated business machines.

Another object of the present invention is to provide a new and improved apparatus for controlling the carriage return movement in electrically operated business machines wherein continual energization of the carriage return driving means is prevented when the carriage is in the desired end position or overshoot position thereof.

Still another object of the present invention is to provide a new and improved control circuit and apparatus for carriage return movement in electrically operated business machines wherein the moment of inertia of the carriage driving means is used to brake the movement of the carriage in the desired end position.

Yet another object of the present invention is to provide a new and improved control circuit and apparatus for the carriage return movement in electrically operated business machines wherein the driving means for the carriage may be deenergized whenever desired.

Still another object of the present invention is to provide a new and improved control apparatus for the carriage return movement in electrically operated business machines wherein movement of the keys in the keyboard of the business machine may be prevented during the carriage return movement.

With the above objects in view, the present invention relates to an apparatus for controlling the carriage return movement in electrically operated business machines and including electrically operable moving means for moving the carriage to a desired end position, energizing means connected in circuit with the moving means for energizing the same so as to move the carriage to the desired end position, whenever desired, first switching means connected in circuit between the energizing means and the moving means and being movable between an operable position wherein the moving means is energized and an inoperable position wherein the moving means is deenergized, and second switching means connected in circuit between the energizing means and the moving means and movable between an operable position wherein the first switching means is rendered ineffective and an inoperable position, the second switching means being adapted to be moved from its inoperable position to its operable position when the carriage is moved beyond its desired end position.

In a preferred embodiment of the present invention the moving means includes electrically operable driving means coupled to a rotatable member for moving the carriage. The coupling member may include a mechanical clutch arrangement or an electromagnetically operated clutch arrangement.

In another embodiment of the present invention relays are provided in the energizing circuit of the electrically operable moving means for energizing and deenergizing the moving means at desired positions of the carriage of the machine.

In still another embodiment of the present invention switching means are provided in the overshoot position of the carriage for deenergizing the electric motor used in the moving means while still permitting the electric motor to remain coupled to the moving means in deenergized condition.

In a further embodiment of the present invention the electric driving motor has a stator winding which is shortcircuited to increase the braking effect of the carriage movement.

The novel features which are considered as characteristic for the invention are set forth in particular in the appended claims. The invention itself, however, both as to its construction and its method of operation, together with addiitonal objects and advantages thereof, will be best understood from the following description of specific embodiments when read in connection with the accompanying drawings, in which:

Figure 1:
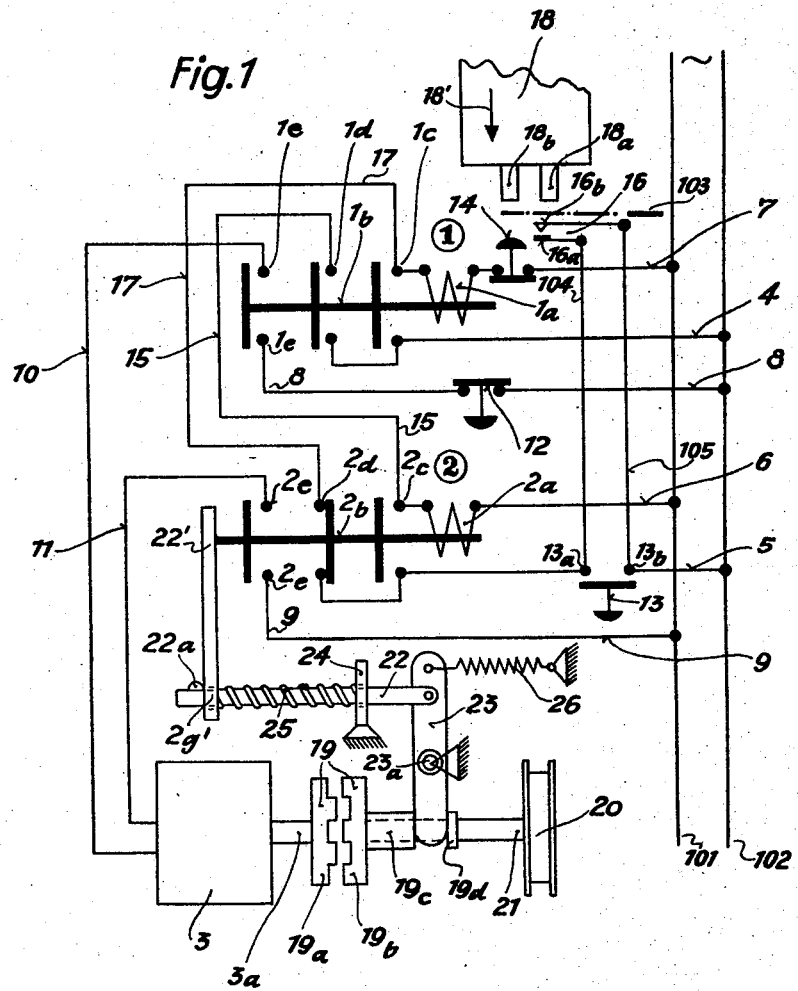
Fig. 1 is an electrical schematic diagram showing the electrical connections of one embodiment of the present invention and showing some of the structural elements thereof in diagrammatic form.

Referring to the drawings and more particularly to Fig. 1, it can be seen that electrical conductors 101 and 102 are provided and are adapted to be connected to a source of potential for energizing the apparatus. Connected to the conductor 101 by means of a conductor 7 is one side of a relay winding 1a of a relay 1. It can be seen that a normally closed switch 14 is connected in circuit between the conductor 7 and the first terminal of the relay winding 1a.

The other terminal of the relay winding 1a is connected by a conductor 17 to a normally closed contact 2d of a second relay 2. Relay 2 has a relay winding 2a one terminal of which is connected by a conductor 6 to the supply conductor 101 and the other terminal of which is connected to a normally open contact 2c thereof. The contact 2c, in turn, is connected by a conductor 15 to a normally open contact 1d of the relay 1.

The relay 1 has a slidable armature 1b thereof which is shown in the normally unenergized position. It can be seen that relay 1 is provided with three pairs of normally open contacts 1c, 1d, and 1e, which are all closed when the relay winding 1a is energized.

Similarly, the relay 2 is provided with a movable armature 2b and three pairs of contacts, respectively 2c, 2d, and 2e. However, only the contact pairs 2c and 2e are normally open, the contact pair 2d being shown normally closed in the unenergized condition. When the relay winding 2a of the relay 2 is energized, the armature 2b moves to close the normally open contacts and open the normally closed contacts.

Connected to one of the normally open contacts 2e by a conductor 11 is one terminal of a driving motor 3. The other normally open contact 2e is connected by a conductor 9 directly to the supply conductor 101.

The other terminal of the motor 3 is connected by a conductor 10 to one of the normally open contacts 1e of the relay 1, the other contact 1e being connected by a conductor 8 through a normally closed manually operable push button switch 12 to the supply conductor 102.

In the upper portion of Fig. 1 is diagrammatically shown a part of the carriage 18 of the business machine. When the carriage 18 is moved into its desired return or end position it moves in the direction of the arrow 18'. It can be seen that the carriage 18 is provided with two projecting members 18a and 18b, the free end portions of which are to be aligned with the dotted line 103 when the carriage is in its desired end position. That is, the dotted line 103 corresponds to a position wherein the carriage proper will be in a desired position if the free end portions 18a and 18b are aligned therewith.

It can be seen that on the other side of the line 103 is a normally open switch 16 having leaf spring mounted contacts 16a and 16b. Contacts 16a and 16b are adapted to be engaged by the free end portion of the projecting member 18a and moved into circuit closing position if the carriage 18 overshoots the desired end position thereof. The contact 16a is connected by a conductor 104 to one terminal 13a of a normally open manually operable push button starting switch 13. The other terminal 13b of the switch 13 is connected by a conductor 5 to the supply conductor 102 and by a conductor 105 to the second contact 16b of the switch 16.

The motor 3 is provided with a shaft 3a which in turn is connected to the driving member 19a of a clutch 19. The driven member 19b is fixedly connected to a tubular member 19c which is keyed to a shaft 21 at the other end of which is connected a roller 20. The tubular member 19c is axially displaceable with respect to the shaft 21 but is keyed thereto so as to rotate therewith. The roller 20 is used for moving the carriage 18 to its desired end position. For this purpose a band is wrapped around the outer surface of the roller 20 and is connected to the carriage 18 in a conventional manner. This band between the roller 20 and the carriage 18 is not illustrated in order to avoid unnecessarily complicating the drawing.

The tubular member 19c is provided with an annular recess 19d in which is disposed the free end of a double-armed lever 23 that is pivoted about a fixed pivot point 23a. The free end of the lever 23 cooperating with the annular groove 19d may be fork-shaped.

The other end of the lever 23 is connected to one end of a spring 26, the other end of which is fixedly mounted on a support means adjacent the carriage 18. The action of the spring 26 is to continuously urge the driven member 19b of the clutch 19 into engagement with the driving member 19a thereof.

Also connected to the other arm of the lever 23 is the end of another lever 22 which passes through a hole in a fixed member 24, also mounted on the support means adjacent to carriage 18. The lever 22 also passes through a second hole 2g' of a lever 22' and has a stop member 22a at the free end portion thereof.

Wound about the lever 22 and disposed between the members 22' and 24 is a strong coil spring 25. The spring 25 urges the lever 22' against the stop member 22a and is strong enough to overcome the action of the spring 26. Therefore, the normal, deenergized position of the apparatus is as illustrated with the coupling members of the clutch 19 out of engagement.

It can be seen that the lever 22' is fixedly connected to the slidable armature 2b of the relay 2.

The purpose of the illustrated control circuit and apparatus in Fig. 1 is to electrically return the carriage 18 to the desired end position illustrated by the dotted line 103. Not illustrated in Fig. 1 is a braking spring which acts as a resilient stop means for braking the movement of the carriage 18 when the same overshoots the desired end position. This resilient braking means may be the same as the type used in conventional carriage return mechanisms and is accordingly not illustrated in Fig. 1 in order to avoid unnecessarily complicating the drawing.

In operation, the circuit components occupy the position illustrated in Fig. 1 before the carriage return movement is commenced. To return the carriage to its desired end position, the starting switch 13 is depressed. This energizes the relay winding 1a of the relay 1 through the following circuit: supply conductor 102; conductor 5; closed switch 13; normally closed contacts 2d of the relay 2; conductor 17; normally open contact 1c of the relay 1; the relay winding 1a; normally closed switch 14; and conductor 7 to the other supply conductor 101.

Energization of the relay winding 1a of the relay 1 attracts the slidable armature 1b and causes the same to move to the right so that contacts 1c, 1d and 1e are closed. It should be noted that as soon as contacts 1c of the relay 1 are closed, the winding 1a thereof is connected by conductor 4 to the supply conductor 102 so that the relay becomes self-holding.

Similarly, the closing of contacts 1d of the relay 1 energizes the winding 2a of the relay 2 in the following manner: supply conductor 101; conductor 6; winding 2a; normally open contact 2c; conductor 15; closed contacts 1d; and conductor 4 to supply conductor 102. The energization of the winding 2a of the relay 2 causes the same to attract its armature and move the slidable armature 2b thereof to the right. This closes the contacts 2c and 2e and opens the contacts 2d. The opening of the contacts 2d is no longer of any importance since the relay 1 is already self-holding. Similarly, the closing of the contacts 2c renders the relay 2 self-holding if either switch 13 or switch 16 is closed.

The closing of the contacts 2e of the relay 2 energizes the motor 3 in the following manner: supply conductor 101; conductor 9; closed contacts 2e of the relay 2; conductor 11; motor 3; conductor 10; closed contacts 1e of the relay 1; conductor 8; and normally closed switch 12 to the supply conductor 102. The motor 3 therefore starts rotating to rotate the driving member 19a of the clutch 19.

Since the armature 2b of the relay 2 has been moved to the right, the lever 22' connected thereto has been moved along the lever 22 against the action of the spring 25, thereby compressing the same. This permits the spring 26 to move the lever 22 to the right until the stop member 22a again contacts the lever 22'. At the same time of course the double-armed lever 23 is pivoted about its pivot point 23a. This shifts the tubular member 19c and driven member 19b thereof to the left and into engagement with the driving member 19a.

The motor 3 is now directly coupled to the roller 20 and rotates the same thereby moving the carriage 18 in the direction of the arrow 18' by the unillustrated band means wound thereabout. At this time it should be noted that whether the switch 13 is in circuit opening or circuit closing position is of no consequence to the operation of the circuit. That is, once the push button switch 13 has been initially depressed and the relay 1 is energized, the relay 1 becomes self-holding and the relay 2 is energized through the energized relay 1. Therefore, release of the switch 13 will not affect the movement of the carriage 18.

Figure 4:
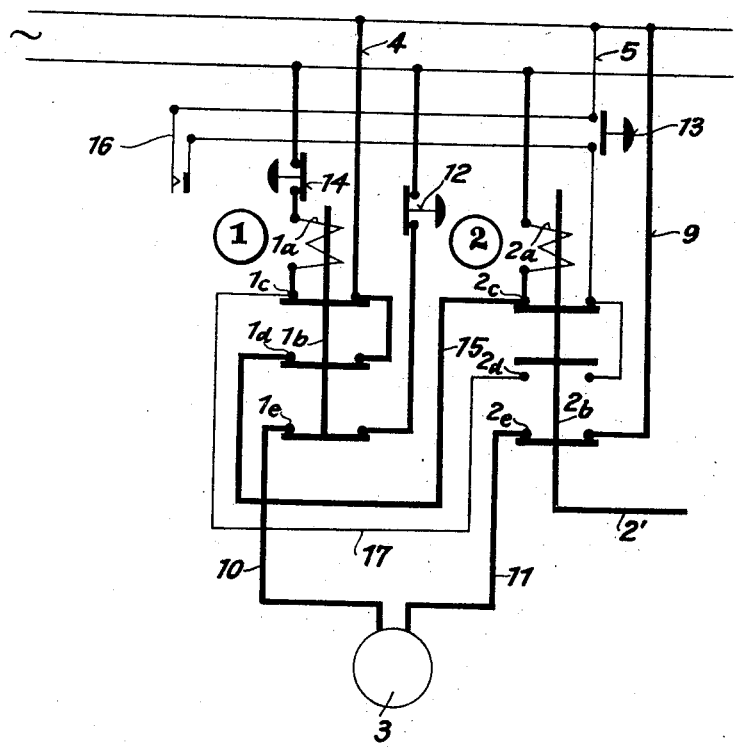
Fig. 4 is an electrical schematic diagram showing the circuit connections of the apparatus when the driving motor is energized.

Referring now to Fig. 4 the electrical components of the circuit diagram of Fig. 1 are shown. In Fig. 4 those conductors which are carrying current are shown in heavy lines while those conductors which are not carrying current are shown in thinner lines. This permits the energized circuit to be more easily traced in Fig. 4. It can be seen from this figure that relays 1 and 2 and the motor 3 are energized even though the switches 13 and 16 are in the open position.

Referring again to Fig. 1, as the carriage approaches its desired end position illustrated by line 103 there is a tendency for the carriage to overshoot this position. When this occurs the projecting member 18a first contacts the contact 16b of the switch 16, moving the same into electrical contact with the contacts 16a. After the switch 16 is closed by the projecting member 18a, the projecting member 18b of the carriage contacts the push button of switch 14, opening the same.

When the switch 14 is opened, the relay winding 1a of relay 1 is deenergized and the armature 1b thereof is moved back to its original illustrated position. This deenergizes the motor 3 since the contacts 1e of the relay 1 are again in the open position. However, the relay 2 remains energized since the contacts 2c thereof are connected to the supply conductor 102 through the closed switch 16. Therefore, the clutch 19 remains in coupled position and the motor 3 remains mechanically connected to the roller 20.

As the carriage 18 enters its overshoot position, the braking spring starts to be compressed and when the switch 14 is opened the braking spring, unillustrated, is still more highly compressed. Therefore, when the motor 3 is deenergized so that its driving forces are cut off, the compressed braking spring provides enough force to move the carriage back from its overshoot position to its desired end position at the line 103. However, the motor 3, due to its moment of inertia, may still be rotating. Accordingly, the compressed braking spring must move the carriage 18 back to the desired end position against the braking effect of the rotating armature of the motor 3.

In this manner the deenergized, still rotating motor presents a damping effect so that the carriage 18 is moved smoothly back to the desired end position.

As long as the carriage 18 is in the overshoot position and switch 16 is closed, operation of the starting switch 13 will have no effect. That is, since the relay 2 remains energized while the carriage 18 is in the overshoot position, its contacts 2d remain open and energization of the relay 1 is not possible. In this manner, continuous operation of the carriage return movement by depressing the switch 13 or keeping the switch 13 depressed while the carriage is in the overshoot position, is not possible. This prevents the undesired vibration and noise effects present in conventional apparatus.

It is clear that once the carriage 18 is moved back to the desired end position and the switch 16 is opened, the relay 2 becomes deenergized again rendering the carriage return movement effective. However, if it is desired to maintain the carriage return movement ineffective until the carriage 18 is moved in the other direction away from its desired end position, it is clear that the line 103 can be made to coincide with the closed contact position of the switch 16. In this event, operation of the switch 13 will have no effect after the carriage reaches its desired end position.

Figure 5:
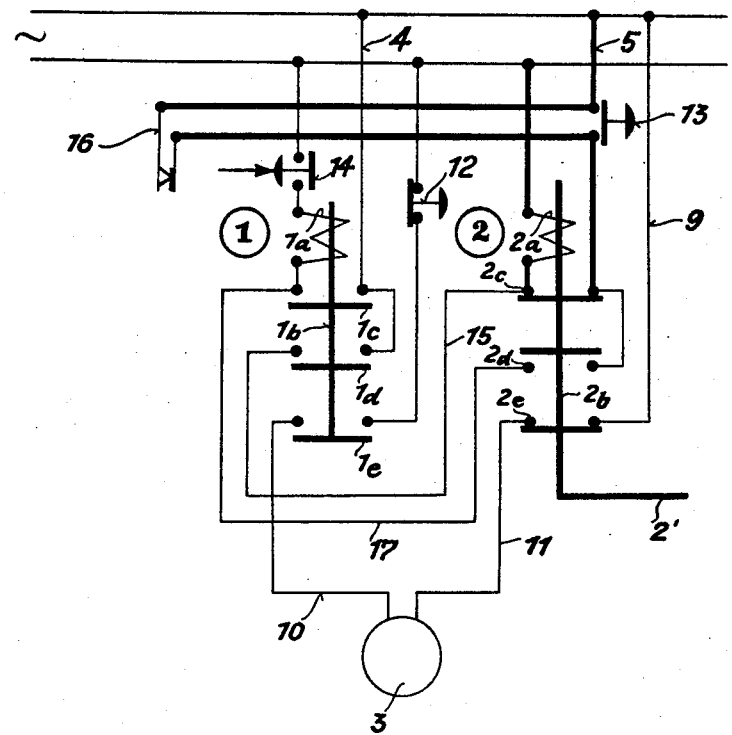
Fig. 5 is an electrical schematic diagram showing the electrical connections of the apparatus when the carriage is in the overshoot position.

Referring to Fig. 5, an equivalent circuit diagram to Fig. 1 is shown when the carriage 18 is in the overshoot position, the switch 16 is closed and the switch 14 is opened. Those conductors which are carrying current are shown in thick, darker lines and those conductors which are not carrying current are shown in thinner lines. It can be seen that the relay 1 and the motor 3 are deenergized in Fig. 5 while the relay 2 is still energized.

Figure 2:
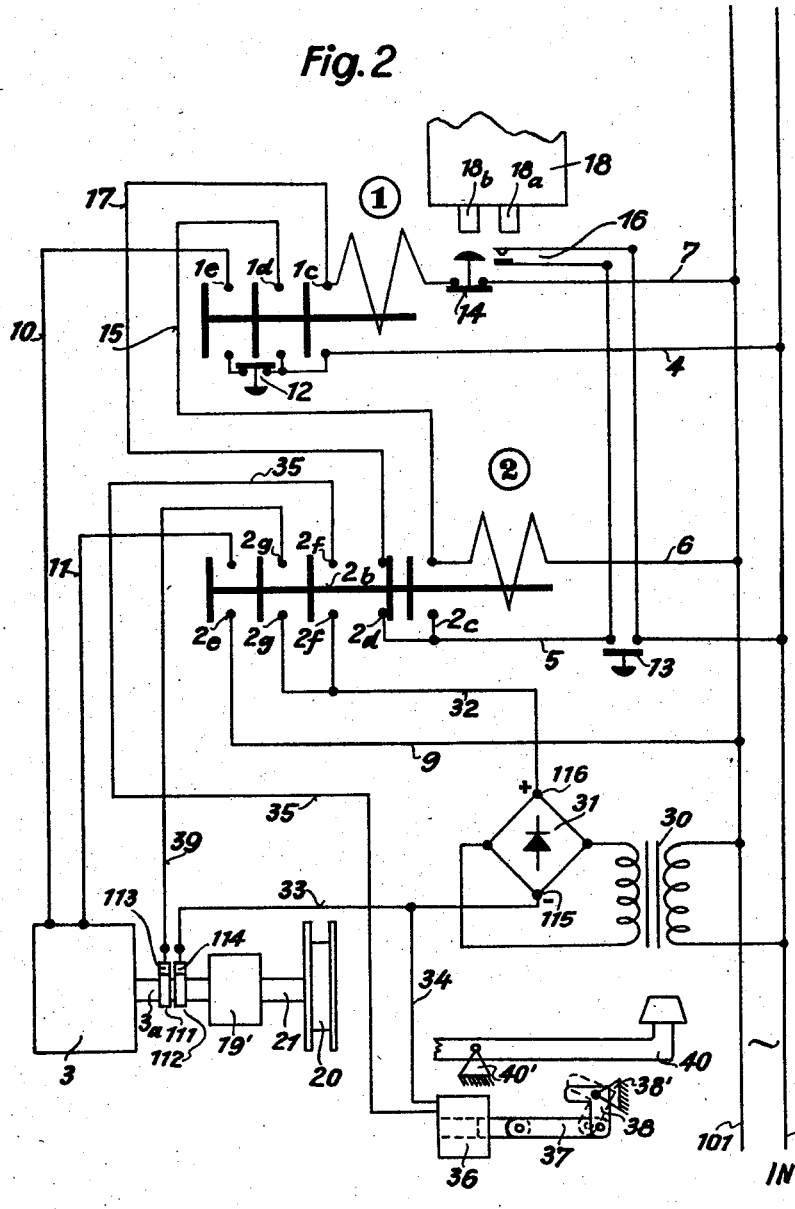
Fig. 2 is an electrical schematic diagram of a second embodiment of the present invention.

Referring now to Fig. 2, a second embodiment of the present invention will be explained. In this figure those parts which have the same numerals as in Fig. 1 carry out the same function. The relay 2 in Fig. 2 is provided with two additional pairs of normally open contacts, namely contacts 2f and 2g. Also, in this figure the armature 2b of the relay 2 is not provided with the mechanical lever connections for operating the coupling member between the motor and the roller 20.

In the embodiment of Fig. 2 in place of the mechanical clutch 19, an electromagnetic clutch 19' is provided. The clutch 19' has the driven member thereof mounted on the shaft 21 and the driving member thereof mounted on the shaft 3a of the motor. As is well known, in the electromagnetic clutches of this type, energization of the windings of the clutch influences the magnetic particles therein and provides an electromagnetic coupling between the driving member and the driven member thereof. These electrical connections to the electromagnetic clutch 19' are provided by slip rings 111 and 112 fixedly mounted on shaft 3a and rotatable therewith. The slip rings 111 and 112 are preferably insulated from each other and connected by conductors, unillustrated, to the driving member of the clutch 19'.

Making sliding contact with the slip ring 111 is a brush 113 which is connected by a conductor 39 to one of the normally open contacts 2g of the relay 2. A second electrical brush 114 makes sliding contact with the slip ring 112 and is connected by a conductor 33 to the negative terminal 115 of a full wave rectifier 31. The alternating current input to the rectifier 31 is provided by the secondary winding of a transformer 30, the primary winding of which is connected across the supply conductors 101 and 102. The positive terminal 116 of the rectifier 31 is connected by conductor 32 to contacts 2f and 2g. The other normally open contact 2f is connected by conductor 35 to one terminal of a solenoid 36, the other terminal of which is connected by conductor 34 to the negative terminal 115 of the rectifier 31. The core 37 of the solenoid is shown in its normally ejected position. The free end portion of the core 37 is pivotally connected to a lever 38, which is in turn pivotally connected to a fixed support member 38'. Adjacent the member 38 is a key lever 40 which is pivotally mounted about a fixed support member 40'. The key lever 40 represents one or more of the keys on the keyboard of the business machine, which keys are normally operated by pivoting about their respective pivotal support members.

In operation, as before, movement of the starting switch 13 into circuit closing position will energize the relay 1 through the normally closed contacts 2d of the relay 2. Energization of the relay 1 will bring about closure of its normally open contacts 1c, 1d and 1e. The closing of the contacts 1d will energize the relay 2 and the closing of contacts 1c will make the relay 1 self-holding.

The closing of the contacts 1e will connect one terminal of the motor 3 to the supply conductor 102.

When the relay 2 is energized, the closing of the contacts 2e thereof will connect the other terminal of the motor to the supply conductor 101, thereby rotating the shaft 3a of the motor and the driving member of the electromagnetic clutch 19'. Closing of the contacts 2g of the relay 2 will connect the brush 113 to the positive terminal 116 of the rectifier 31. Since the other brush 114 is already connected to the negative terminal 115, the full output voltage of the rectifier 31 will be applied between the brushes 113 and 114.

From the brushes 113 and 114 the voltage is applied through the slip rings 111 and 112 to the electromagnetic clutch 19'. This supplies the electromagnetic coupling between the driving and driven members of the clutch to rotate the shaft 21 and the roller 20. Therefore, the movement of the carriage 18 is started towards its desired end position.

When the carriage 18 reaches its desired end position, the operation of the circuit is as described hereinabove with respect to Fig. 1. That is, the switch 16 is first closed and then the switch 14 is opened to deenergize the relay 1 and the motor 3. The relay 2 remains energized so that the inertia of the motor damps movement of the carriage 18 from its overshoot position back to its desired end position. When the carriage 18 is moved so that the switch 16 is opened, the relay 2 is deenergized and the circuit is restored to its initial operating condition.

A further feature of the arrangement shown in Fig. 2 is the key blocking arrangement provided by the solenoid 36. It can be seen that when the contacts 2f of the relay 2 are closed, the solenoid is connected across the output of the rectifier 31. This energizes the solenoid 36 causing it to attract its core 37 within the body of the solenoid so that the lever 38 is pivoted to the illustrated dotted position. This prevents downward movement of the key 40 and effectively blocks operation of this key. Similarly, movement of all the keys of the business machine can be similarly blocked so that it would be impossible to operate the key while the carriage 18 is moving back to its desired end position.

Figure 3:
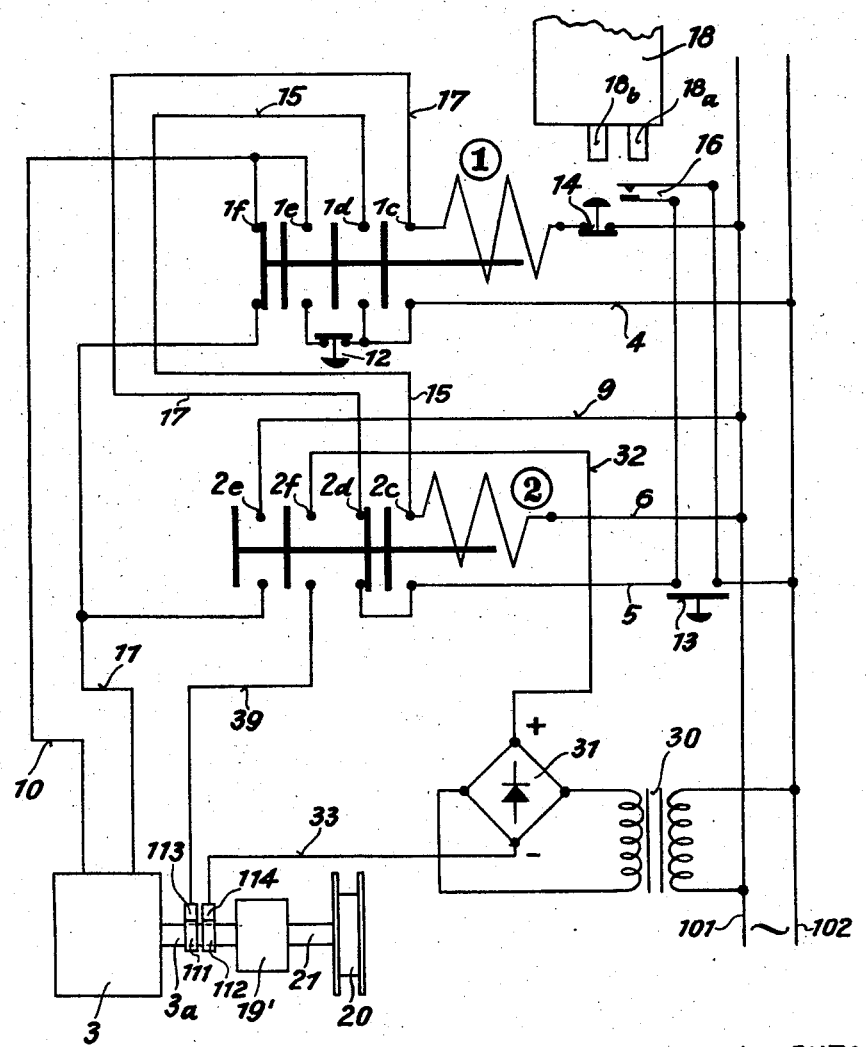
Fig. 3 is an electrical schematic diagram of another embodiment of the present invention.

Referring now to Fig. 3, still another embodiment of the present invention is shown. As before, the parts designated with the same numerals in the various figures have the same function. In Fig. 3 the relay 1 is provided with a pair of normally closed contacts 1f. It can be seen that the terminals of the motor 3 are connected by means of conductors 10 and 11 to these normally closed contacts. Therefore, the stator winding of the motor is shortcircuited when the relay 1 is deenergized.

Otherwise the circuit operation is similar to that described hereinabove with respect to Fig. 2. However, when the carriage 18, in the overshoot position, opens the switch 14, and the relay 1 is deenergized, the stator winding of the motor is immediately shortcircuited. This adds to the damping effect of the motor which is connected to the carriage 18 as the carriage 18 moves back from the overshoot position to its desired end position.

It is accordingly seen that by use of the control circuit and apparatus of the present invention, it is possible to provide a carriage return movement which is smoothly operating. The circuit embodying the principles of the present invention also prevents repeated back and forth movement of the carriage while it is in the overshoot position and the starting key is depressed. This prevents excessive vibration and the additional loud noise factors.

It should be appreciated that the carriage may be returned from any one of a plurality of positions depending upon the position of the carriage on the business machine. That is, the carriage may move a total distance corresponding to only an inch or less or to a distance one foot or more when the carriage is moved to its return position, that is, its desired end position, through a distance of one foot or more. It can be appreciated that in an electrically operable machine such movement would provide excessive wear if the carriage movement is not properly damped.

The desired end position of the carriage is usually determined by the setting of the left-hand margin in a business machine such as an electrically operable typewriter. Therefore, the switches 16 and 14 are preferably mounted on the margin setting mechanism so that they always occupy a predetermined position with respect to the desired end position of the carriage 18.

It will be understood that each of the elements described above, or two or more together, may also find a useful application in other types of electrically operated machines differing from the types described above.

While the invention has been illustrated and described as embodied in an apparatus for controlling the carriage return movement in electrically operated business machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for controlling the carriage return movement in an electrically operated business machine, in combination, a support means adpated to be mounted adjacent the carriage to be moved; moving means rotatably mounted on said support means and adapted to be connected to the carriage for moving the same to a desired end position; electrically operable driving means adapted to be coupled to said moving means for rotating the same; coupling means connected between said driving means and said moving means and adapted to be moved between a coupled position wherein said driving means is coupled to said moving means and an uncoupled position; energizing means connected in circuit with said driving means actuating for energizing the same; first relay means having a plurality of normally open first contacts connected in circuit between said energizing means and said driving means, said first contacts being closed when said first relay means is energized; second relay means having a plurality of normally open second contacts connected in circuit between said energizing means, said first contacts and said driving means, said last mentioned second contacts being closed when said second relay means is energized, thereby energizing said driving means, said second relay means being operatively connected to said coupling means for moving the same to coupled position when said second relay means is energized; switching means connected in circuit between said relay means and said energizing means and being movable between an operable position wherein said relay means are energized and an inoperable position; and means actuated by movement of the carriage for rendering said switching means ineffective when the carriage is moved beyond its desired end position.

2. In an apparatus for controlling the carriage return movement in an electrically operated business machine, in combination, a support means adapted to be mounted adjacent the carriage to be moved; moving means rotatably mounted on said support means and adapted to be connected to the carriage for moving the same to a desired end position; electrically operable driving means adapted to be coupled to said moving means for rotating the same; coupling means connected between said driving means and said moving means and adapted to be moved between a coupled position wherein said driving means is coupled to said moving means and an uncoupled position; energizing means connected in circuit with said driving means actuating for energizing the same; first relay means having a plurality of normally open first contacts connected in circuit between said energizing means and said driving means, said first contacts being closed when said first relay means is energized; second relay means having a plurality of normally open second contacts connected in circuit between said energizing means, said first contacts and said driving means, said last mentioned second contacts being closed when said second relay means is energized, thereby energizing said driving means, said second relay means being operatively connected to said coupling means for moving the same to coupled position when said second relay means is energized; first switching means connected in circuit between said relay means and said energizing means and being movable between an operable position wherein said relay means are energized and an inoperable position; and second switching means adapted to be engaged by the carriage and being movable by the same into an operable position for rendering said first switching means ineffective when the carriage is moved beyond its desired end position.

3. In an apparatus for controlling the carriage return movement in an electrically operated business machine, in combination, a support means adapted to be mounted adjacent the carriage to be moved; moving means rotatably mounted on said support means and adapted to be connected to the carriage for moving the same to a desired end position; electrically operable driving means adapted to be coupled to said moving means for rotating the same; coupling means connected between said driving means and said moving means and adapted to be moved between a coupled position wherein said driving means is coupled to said moving means and an uncoupled position; energizing means connected in circuit with said driving means actuating for energizing the same; first relay means having a plurality of normally open first contacts connected in circuit between said energizing means and said driving means, said first contacts being closed when said first relay means is energized; second relay means having a plurality of normally open second contacts connected in circuit between said energizing means, said first contacts and said driving means, said last mentioned second contacts being closed when said second relay means is energized, thereby energizing said driving means, said second relay means being operatively connected to said coupling means for moving the same to coupled position when said second relay means is energized; switching means connected in circuit between said relay means and said energizing means and being movable between an operable position wherein said relay means are energized and an inoperable position; means actuated by movement of the carriage for rendering said switching means ineffective when the carriage is moved beyond its desired end position; and holding means for maintaining said coupling means in coupled position when said first relay means is moved from energized into deenergized position.

4. In an apparatus for controlling the carriage return movement in an electrically operated business machine, in combination, a support means adapted to be mounted adjacent the carriage to be moved; moving means rotatably mounted on said support means and adapted to be connected to the carriage for moving the same to a desired end position; electrically operable driving means adapted to be coupled to said moving means for rotating the same; coupling means connected between said driving means and said moving means and adapted to be moved between a coupled position wherein said driving means is coupled to said moving means and an uncoupled position; energizing means connected in circuit with said driving means actuating for energizing the same; first relay means having a plurality of normally open first contacts connected in circuit between said energizing means and said driving means, said first contacts being closed when said first relay means is energized; second relay means having a plurality of normally open second contacts connected in circuit between said energizing means, said first contacts and said driving means, said last mentioned second contacts being closed when said second relay means is energized, thereby energizing said driving means, said second relay means being operatively connected to said coupling means for moving the same to coupled position when said second relay means is energized; switching means connected in circuit between said relay means and said energizing means and being movable between an operable position wherein said relay means are energized and an inoperable position; means connected in circuit between said first relay and said energizing means and actuated by movement of the carriage for deenergizing said first relay means when the carriage is moved beyond its desired end position; and holding means for holding said second relay means in energized position after said first relay means is deenergized.

5. Apparatus as claimed in claim 1 wherein said electrically operable driving means is an electrical motor having a stator winding; and including means for short circuiting said stator winding when said first relay is deenergized.

6. Apparatus as claimed in claim 1 wherein said driving means is an electric motor and including a manually operable switching means for deenergizing said motor whenever desired.

7. Apparatus as claimed in claim 1 wherein said business machine includes a plurality of keys mounted on the keyboard and having a blocking member adjacent said keys for blocking operation of the same whenever said driving means is energized.

8. In an apparatus for controlling the carriage return movement in an electrically operated business machine, in combination, a support means adapted to be mounted adjacent the carriage to be moved; moving means rotatably mounted on said support means and adapted to be connected to the carriage for moving the same to a desired end position; electrically operated driving means; electromagnetic coupling means between said driving means and said moving means and assuming, when energized, a coupled position coupling said driving means to said moving means; energizing means connected in circuit with said driving means and said electromagnetic coupling means for energizing the same; first relay means having a plurality of normally opened first contacts connected in circuit between said energizing means and said driving means, said first contacts being closed when said first relay is energized; second relay means having a plurality of normally open second contacts connected in circuit between said energizing means, said first contacts, and said driving means, and other second contacts connected in circuit between said energizing means and said electromagnetic coupling means, all said second contacts being closed when said second relay means is energized thereby energizing said driving means and said electromagnetic coupling means so that said driving means drives said moving means through said coupling means; switching means connected in circuit between said relay means and said energizing means and being movable between an operable position wherein said relay means are energized, and an inoperable position; and means actuated by movement of the carriage for rendering said switching means ineffective when the carriage is moved beyond its desired end position.

9. In an apparatus for controlling the carriage return movement in an electrically operated business machine, in combination, electric motor means for driving the carriage to a desired end position; energizing means connected in circuit with said electric motor means; first relay means having a plurality of normally open first contacts connected in circuit with said energizing means and said electric motor means, said first contacts being closed when said first relay is energized; second relay means having a plurality of normally open second contacts connected in circuit between said energizing means, said first contacts and said electric motor means, said second contacts being closed when said second relay means is energized for energizing said motor means; switching means connected in circuit between said relay means and said energizing means and being movable to an operable position wherein said relay means are energized, and an inoperable position; and means actuated by movement of the carriage for rendering said switching means ineffective when the carriage is moved beyond its desired end position.

10. In an apparatus for controlling the carriage return movement in an electrically operated business machine, in combination, electric motor means for driving the carriage to a desired end position; electromagnetic coupling means between said electric motor means and the carriage and being movable between a coupled position and an uncoupled position; energizing means connected in circuit with said electric motor means and with said electromagnetic coupling means; first relay means having a plurality of normally open first contacts connected in circuit with said energizing means and said electric motor means, said first contacts being closed when said first relay is energized; second relay means having a plurality of normally open second contacts connected in circuit between said energizing means, said first contacts and said electric motor means, said second contacts being closed when said second relay means is energized for energizing said motor means, said second relay means having other normally open second contacts connected in circuit between said energizing means and said electromagnetic coupling means, said other second contacts being closed when said second relay means is energized for actuating said electromagnetic coupling means to move to coupled position; switching means connected in circuit between said relay means and said energizing means and being movable to an operable position wherein said relay means are energized, and an inoperable position; and means actuated by movement of the carriage for rendering said switching means ineffective when the carriage is moved beyond its desired end position.

11. In an apparatus for controlling the carriage return movement in an electrically operated business machine, in combination, electric motor means for driving the carriage to a desired end position; coupling means between said electric motor means and the carriage and being movable between a coupled position and an uncoupled position; energizing means connected in circuit with said electric motor means; first relay means having a plurality of normally open first contacts connected in circuit with said energizing means and said electric motor means, said first contacts being closed when said first relay is energized; second relay means having a plurality of normally open second contacts connected in circuit between said energizing means, said first contacts and said electric motor means, said second contacts being closed when said second relay means is energized for energizing said motor means, said second relay means including a movable member connected to said coupling means and moving to an operative position when said second relay means is energized for moving said coupling means to coupled position; switching means connected in circuit between said relay means and said energizing means and being movable to an operable position wherein said relay means are energized, and an inoperable position; and means actuated by movement of the carriage for rendering said switching means ineffective when the carriage is moved beyond its desired end position.

12. In an apparatus for controlling the carriage return movement in an electrically operated business machine, in combination, energizing means; electric motor means; coupling means movable to a coupling position for connecting said electric motor means with the carriage for driving the carriage to a desired end position; a starting switch means connected into the circuit of said electric motor means and said energizing means; first relay means having a plurality of first contacts; second relay means having a plurality of second contacts, selected first and second contacts being connected into the circuit of said energizing means, said starting switch means, said electric motor means and to each other, respectively, so that upon actuation of said starting switch means said first and second relay means are energized and said starting switch means is disconnected from said electric motor means while said electric motor means is connected by selected contacts to said energizing means, said second relay means being operatively connected to said coupling means for moving the same to said coupling position when said second relay means are energized; a first normally open switch means, and a second normally closed switch means adapted to be operated by the carriage when the same overshoots said end position, said second switch means being connected into the circuit of said first relay means for deenergizing the same upon actuation by the carriage, and said first switch means being connected into the circuit of said second relay means for maintaining the same in energized condition while being closed by the carriage whereby said coupling is in coupling position and said motor is deeneregized while said carriage is in an overshot position beyond said end position, said carriage tending to move from said overshot position to said end position.

13. In an apparatus for controlling the carriage return movement in an electrically operated business machine, in combination, energizing means; electric motor means; coupling means movable to a coupling position for connecting said electric motor means with the carriage for driving the carriage to a desired end position; a starting switch means connected into the circuit of said electric motor means and said energizing means; first relay means having a plurality of first contacts connected in circuit with said energizing means and said electric motor means, said first contacts being operated when said first relay means is energized; second relay means having a plurality of second contacts connected in circuit between said energizing means, said first contacts and said electric motor means, said second contacts being operated when said second relay means is energized, said second contacts being connected into the circuit of said starting switch means and of said first relay means and said second relay means being connected to said first contacts and into the circuit of said starting switch means so that said first and second relays are energized upon actuation of said starting switch means whereupon said starting switch means is disconnected from said electric motor means while said electric motor means is connected by said first and second contacts to said energizing means, said second relay means being operatively connected to said coupling means for moving the same to said coupling position when said second relay means are energized; a first normally open switch means, and a second normally closed switch means adapted to be operated by the carriage when the same overshoots said end position, said second switch means being connected into the circuit of said first relay means for deenergizing the same upon actuation by the carriage, and said first switch means being connected into the circuit of said second relay means for maintaining the same in energized condition while being closed by the carriage whereby said coupling is in coupling position and said motor is deenergized while said carriage is in an overshot position beyond said end position, said carriage tending to move from said overshot position to said end position.

References Cited in the file of this patent
UNITED STATES PATENTS

| | | |
|---|---|---|
| 909,539 | Burlingame | Jan. 12, 1909 |
| 1,355,089 | Clark | Oct. 5, 1920 |
| 1,370,992 | Parker | May 8, 1921 |
| 1,509,228 | Carino | Sept. 23, 1924 |